Dec. 16, 1969     P. E. NAPOLITANO     3,483,886

RELIEF AND BYPASS VALVE APPARATUS

Filed June 10, 1966     2 Sheets-Sheet 1

INVENTOR
Pellegrino E. Napolitano

BY *Stevens, Davis, Miller & Mosher*
ATTORNEYS

Dec. 16, 1969   P. E. NAPOLITANO   3,483,886
RELIEF AND BYPASS VALVE APPARATUS
Filed June 10, 1966   2 Sheets-Sheet 2

INVENTOR
Pellegrino E. Napolitano

BY
*Stevens, Davis, Miller & Mosher*
ATTORNEYS

United States Patent Office 3,483,886
Patented Dec. 16, 1969

3,483,886
RELIEF AND BYPASS VALVE APPARATUS
Pellegrino E. Napolitano, 1415 57th St.,
Brooklyn, N.Y. 11219
Filed June 10, 1966, Ser. No. 556,661
Int. Cl. F15b 13/02
U.S. Cl. 137—493                                    12 Claims

ABSTRACT OF THE DISCLOSURE

A fluid relief valve mechanism is disclosed consisting of a cartridge assembly fitted into the bore of a housing. The cartridge assembly consists of a cylindrical partition structure subdividing the bore into two chambers with an interconnecting passage and further defining a valve seat. A valve element slidably mounted in the partition structure is urged by a spring to its seated position. At this time, surfaces are presented in both chambers against which fluid pressure acts tending to unseat the valve element. Inlets and outlets communicate with the two chambers so that the valve mechanism will provide fluid relief in both directions.

---

The present invention relates to a relief and bypass valve apparatus. More particularly, the present invention relates to a two-way relief and bypass valve apparatus for operation in hydraulic pump and reversible hydraulic motor systems.

Reversible hydraulic motors, useful with servo systems and the like, rotate in a direction determined by the flow of hydraulic fluid pumped thereto. The hydraulic fluid flows from the pump to the motor and back again through a pair of pipes. A valving mechanism interconnecting the pipes determines the rotational direction of the motor by reversing the direction of the fluid flowing in the pipes between the pump and motor. Thus, the foregoing comprises the basic components of a hydraulic system.

However, equally essential to the hydraulic system are a pair of relief valves (one for each hydraulic line) for protection against either motor overloading or damage to any of the system's components due to excessive pressure, and a bypass valve for cutting out the motor from the hydraulic system altogether. Thus, in the past, one relief valve would be attached between the first and second hydraulic lines at one point in the system, a second relief valve would be attached between the same lines at another point in the system, and a bypass valve would be added at some further point between the two lines. This requires each line to be cut in at least three places which adds a great deal of time and expense to the installation of the system, especially, as is the usual case, when more than one system is used. Moreover, since in most cases other machinery and/or structure would be added after a hydraulic system is installed, the location of at least one or perhaps all three valves would be highly inconvenient for future servicing or replacement.

The present invention answers a demand in the art for providing in a single unit a simply designed two-way relief and bypass valve apparatus, capable of being easily installed in any convenient location, and requiring minimum effort and time for servicing and/or replacement.

The present invention carries out the above by providing a bored out casing having inlet and outlet ports feeding to the bore for permanently attaching each hydraulic line at one convenient location. Slidably fitted within the bore is a removable cartridge secured to the casing by a single cap ring nut. The cartridge includes a partition assembly and a valve assembly. The partition assembly forms with and divides the bore into two chambers, one for each hydraulic line, with an interconnecting passage between the chambers. The valve assembly includes a movable valve whose face normally seals the interconnecting passage, and a manual release actuator. The valve is so designed that part of its pressure responsive face is exposed in one chamber and part is exposed in the other chamber. Thus, the single valve with its novel design relieves, equally, excessive pressure occurring on either hydraulic line by being displaced from its sealing position upon excessive pressure occurring in either respective chamber.

In addition to the above, the present invention includes a bypass valve feature as part of its design. In the event that it is desired to bypass the motor, a manual release actuator (part of the valve assembly described above) can manually displace or unseat the valve from the sealing position, thus connecting the two chambers via the interconnecting passage.

If it is desired to readjust the relief pressure or should for any reason the valve require servicing or replacement, only the cartridge which contains the partition assembly and valve assembly need be removed. This is done by removing the single cap ring nut and sliding out the cartridge.

Accordingly, the principal object of the present invention is to provide in a single apparatus a two-way relief and bypass valve.

Another object of the present invention is to provide a two-way relief and bypass valve apparatus having a single movable valve that independently provides equal relief pressure for each hydraulic line.

Yet another object of the present invention is to provide a two-way relief and bypass valve apparatus formed into a cartridge that is easily and quickly removable from its casing.

A further object of the present invention is to provide a two-way relief and bypass valve apparatus whose relief pressure is adjustable.

A still further object of the present invention is to provide a two-way relief and bypass valve apparatus that is positive and accurate in operation, yet economical to manufacture.

The above and still further objects, features and advantages of the present invention will become apparent upon consideration of the following detailed description of one specific embodiment thereof, especially when taken in conjunction with the accompanying drawings, wherein.

Figure 1:
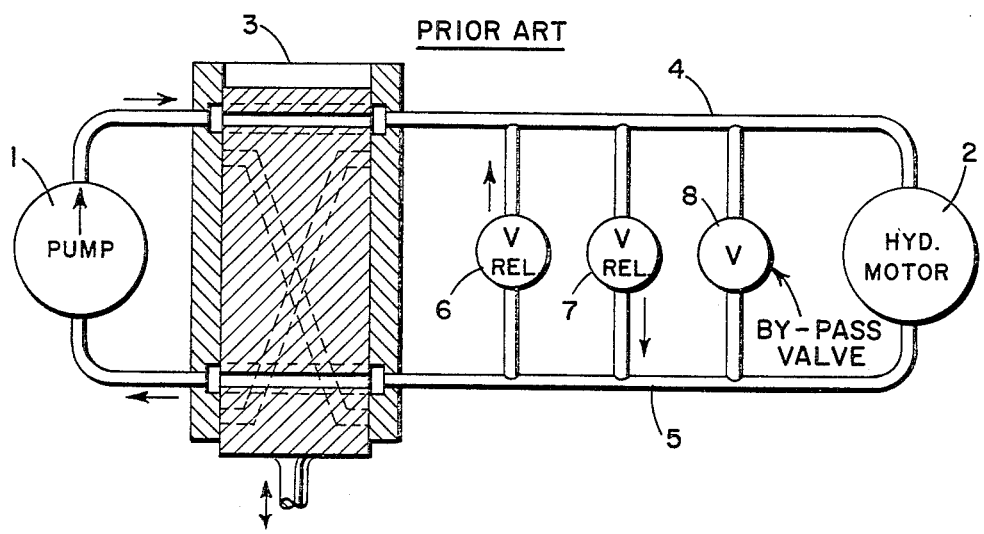
FIG. 1 shows the prior art in diagrammatic form with an axial section of a sliding spool valve for reversing hydraulic flow direction.

Referring to FIG. 1, there is seen a hydraulic system according to the prior art. Such a hydraulic system includes a pump 1 at one end and a hydraulic motor 2 at the other end connected by hydraulic lines 4 and 5. Between the pump and motor, there is a directional determining valve 3, a first relief valve 6, a second relief valve 7, and a bypass valve 8.

In operation, the hydraulic motor 2 is driven by pump 1 in a direction determined by valve 3. In the event of excessive pressure occurring in the system when hydraulic motor 2 is driven in one direction, relief valve 6 operates to relieve the system. Similarly, in the event of excessive pressure occurring when hydraulic motor 2 is driven in the opposite direction, relief valve 7 functions to relieve the system. Should it for any reason be desired to cut the motor from the system altogether, bypass valve 8 is opened to circulate the hydraulic fluid and bypass the motor.

As can be seen in FIG. 1, valves 6, 7 and 8 all require separate and independent attachment to the hydraulic lines running between the pump and motor. This requires a minimum of six openings that must be made in the hydraulic lines to accommodate valves 6, 7 and 8. Later, as is likely to be the case, should additional structure and/or machinery be added to the system, one or all valves would probably be highly inconvenient to reach for servicing, replacement, or merely adjustment. Thus, not only are the valves of the prior art costly in terms of time and money to install, but once installed, expensive to maintain.

Figure 2:
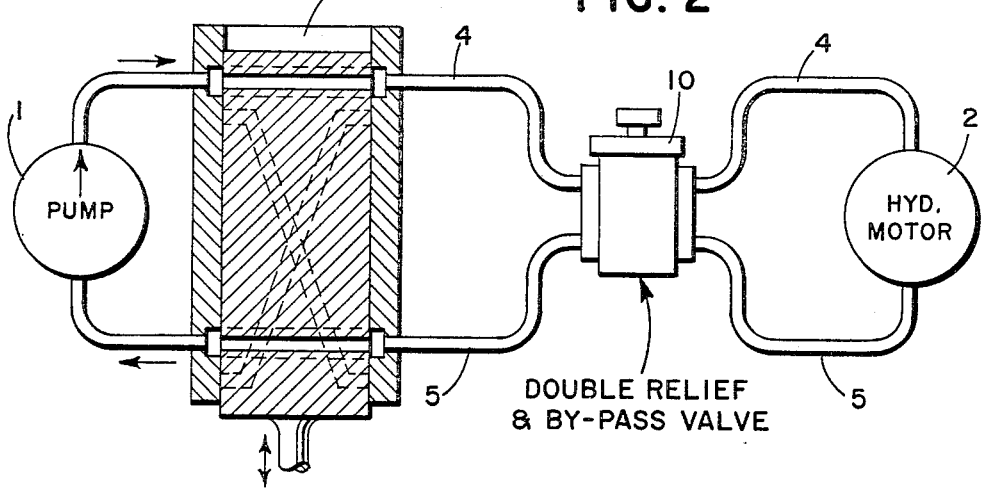
FIG. 2 shows the system depicted by FIG. 1, but with the valve unit according to the present invention in place of the valves employed by the prior art.

FIG. 2 shows the system of FIG. 1 except that the two-way relief and bypass valve apparatus according to the present invention has been substituted for the three valves 6, 7 and 8 of the prior art. Numbers corresponding to those in FIG. 1 have been used in FIG. 2 to show similar elements. Hydraulic lines 4 and 5 are cut at only one place each, and the two-way relief and bypass valve structure 10 is attached. Since the hydraulic lines need be cut only once, the most convenient location for servicing, replacement, or adjustment of the valve may be chosen.

Figure 3:
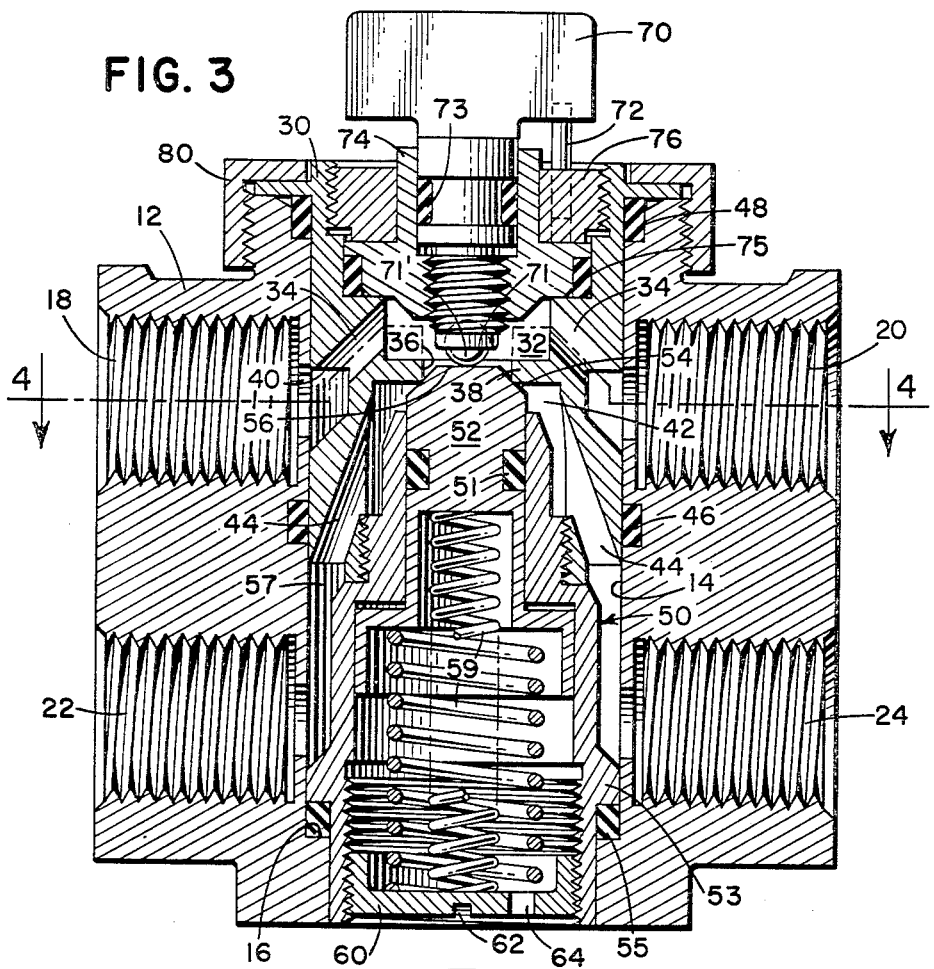
FIG. 3 shows a vertical transverse medial sectional view of the valve cartridge according to the present invention.

FIG. 3 shows the valve structure 10 in detail. A casing 12 is bored out to include a bore 14 and a lip portion 16. Feeding into the upper portion of the bore 14 are ports 18 and 20 that serve either as inlet or outlet ports respectively. A similar set of ports 22 and 24 feed into the lower portion of bore 14. A cartridge comprising a partition assembly 30 secured to a valve assembly 50 slides within the upper end of bore 14 to be fitted against and sealed by lip 16 and O-ring 55 respectively. A cap ring nut 80 and O-ring seal 48 respectively secure and seal the upper portion of the cartridge to casing 12.

The partition assembly 30 is formed from a hollowed-out cylindrical member divided into two chambers 32 and 42 by a partition 38. Interconnecting the two chambers is an opening 36. The upper chamber 32 communicates with inlet and outlet ports 18 and 20 via a plurality of conduits 34. The lower chamber 42 is sealed from bore 14 by O-ring 46. The lower chamber 42 communicates with an annular passageway 57 in bore 14 and eventually to inlet and outlet ports 22 and 24 via a second plurality of conduits 44.

Threaded into the lower end of partition assembly 30 and spaced within the lower portion of bore 14 is a cylindrical valve assembly housing 50. A flange portion 53 of valve assembly housing 50 rests against the lip 16 of bore 14 via O-ring seal 55. The valve assembly housing 50 is hollowed out to accommodate a movable valve member 52 sealed within the housing by O-ring 51. The movable valve member 52 has a recessed under portion for receiving one end of a nest of springs 59, while the other end of springs 59 bears against an adjustable cap 60 threaded into the lower end of valve assembly housing 50. Adjustable cap 60 is provided with a screw driver slot 62 to facilitate adjustment, and a vent 64 to allow free movement of movable valve member 52. The springs 59 are biased so that the face portion 54–56 of valve member 52 presses against and seals opening 36 in the partition assembly 30.

A manual release actuator 70 is spaced with its lower surface portion 71 above valve face 56 of valve member 52 and sealed by O-ring seal 73 within a manual release actuator housing 74. A ball 71' is rotatably secured in the lower face 71 of actuator 70 to reduce friction against valve member 52 when manual release actuator 70 is turned. Manual release actuator housing 70 is sealed and secured within the upper portion of partition assembly 30 by O-ring 75 and screw 76, respectively. Manual release actuator 70 has a flat handle or thumb screw whose rotational travel is limited by a stop pin 72.

Figure 4:
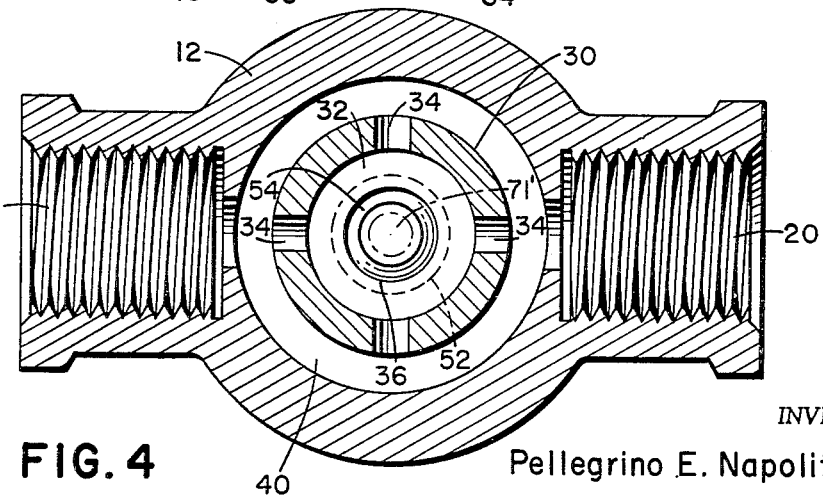
FIG. 4 shows a horizontal sectional view taken along line 4—4 of FIG. 3.

FIG. 4 shows a sectional view of FIG. 3 taken along lines 4—4. Although four conduits 34 are shown interconnecting the upper chamber 32 with recessed annular chamber 40, it should be noted that more or less than four conduits may be emloyed. Similarly, four conduits 44 (not shown) are employed for interconnecting the lower chamber 42 with annular passageway 57.

FIG. 4 shows top plan view of the valve face of movable valve member 52. A more detailed description of the design of valve face 54–56 may be seen with reference to FIG. 5.

Figure 5:
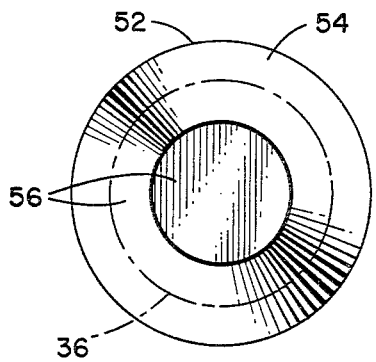
FIG. 5 shows a top plan view of the relief valve member of the present invention.

The dot-dash line shown in FIG. 5 indicates the circumference of opening 36. Thus, that portion of the valve face outside the dot-dash line is exposed to the lower chamber, and that portion of the valve face inside the dot-dash line is exposed to the upper chamber 32. FIG. 5 shows the projection of the vertical component of the valve face on a plane normal to said component, or that area of the valve face exposed to the pressure producing axial movement of valve 52. The valve face is designed so as to make the projected area inside the dot-dash line equal to the projected area outside the dot-dash line. Thus, the pressure producing axial movement of valve 52 in the upper chamber 32 will be equal to the pressure producing axial movement of valve 52 in the lower chamber 42.

Having described in detail the structure of the relief and bypass valve mechanism, the operation is now described with reference to FIG. 3.

Valve casing 12 is secured at some convenient location in the hydraulic system in a well-known manner, with ports 18 and 20 serving one hydraulic line and ports 22 and 24 serving the other hydraulic line. If, by way of example, ports 18 and 20 were made to serve the motor inlet line and ports 22 and 24 were made to serve the motor return line, the hydraulic fluid would flow under normal operating conditions through port 18 and out port 20 via chamber 32, and return through port 24 and out port 22 via chamber 42. There is no inner action of the hydraulic fluid through opening 36 because valve 52 under pressure from springs 59 virtually seals the opening. Valve 52 will become displaced when the fluid pressure in either chamber exceeds the bias set on the springs by adjustable cap 60. Should for any reason the pressure in chamber 32 exceed the relief pressure set, the liquid pressure on valve face 56 overcomes the spring bias and hydraulic fluid flows through opening 36 and into chamber 42 which serves as the return chamber in the above example. If the motor were reversed by reversing valve 3 as explained with references to FIGS. 1 and 2, chamber 42 would be under pressure while chamber 32 would be in the hydraulic fluid flow return path. Since the axial pressure responsive surface of valve face 54 is equal to the axial pressure responsive surface of valve face 56 as explained with reference to FIG. 5, valve 52 would relieve an excess liquid pressure occurring in chamber 42 equivalent to the relief pressure point in chamber 32. Thus, valve 52 serves as a common relief valve for either direction the motor is made to rotate.

If it is desired to bypass the motor, manual release actuator 70 is rotated to cause the ball 71' to make contact with valve 52 displacing same from its sealing position. Fluid flowing through either chamber freely communicates with the other chamber through opening 36. Actuator 70 is so threaded into its housing 74 that only one-half revolution is sufficient to unseat valve 52. Thus, stop pin 72 is placed to conveniently indicate an open or a closed condition of valve 52.

If it is desired to readjust the relief pressure, service the valve, or replace it altogether, the cartridge can be quickly and easily removed by removing cap ring 80. Once cap ring 80 is off, the cartridge containing the valve assembly, the partition assembly, and the bypass actuator easily slides out as a single unit.

Thus, the present invention embodies in a single unit a two-way relief and bypass valve, capable of being installed in any convenient location, and requiring minimum effort and time for servicing or replacement.

While the foregoing describes the preferred embodiment of the invention, it is to be understood that various changes and modifications can be made herein without departing from the spirit and scope of the invention.

What is claimed is:

1. A fluid relief valve mechanism comprising a casing having a bore, a cartridge received in said bore and comprising a partition assembly to divide said bore into a first and second chamber with an interconnecting passage, and a valve assembly including a movable valve element normally sealing said interconnecting passage and operable to be displaced to uncover said passage, said cartridge securing means securing said cartridge in said bore, and an inlet and outlet port through said casing for each of said chambers, said partition assembly comprising a cylindrical insert having a truncated conical recess on one end forming said first chamber, a cylindrical recess on the other end forming said second chamber, an annular partition separating said two recesses, said partition defining a passage therethrough interconnecting said chambers, said partition assembly being secured to the upper portion of said bore by said cartridge securing means.

2. The apparatus as claimed in claim 1 wherein said valve element normally sealing said passage includes a pressure responsive surface exposed to both said first and second chambers such that the fluid pressure exerted against the surface exposed in one chamber will be the same as the fluid pressure exerted against the surface exposed in the other chamber.

3. The apparatus as claimed in claim 1 wherein said valve assembly comprises a cylindrical valve housing spacedly positioned in said second chamber, a spring-biased movable valve element positioned within said housing normally sealing said interconnecting passage, a rotatable means positioned in said first chamber in spaced relationship from said valve element and operable to displace said valve element from said interconnecting passage sealing position.

4. The apparatus as claimed in claim 1 wherein said insert includes an annular recess communicating with said first chamber inlet and outlet ports and a first plurality of conduits interconnecting said annular recess and said first chamber.

5. The apparatus as claimed in claim 4 wherein said insert further includes a second plurality of conduits interconnecting said second chamber and said second chamber inlet and outlet ports via a space defined between said valve assembly and said casing.

6. The apparatus as claimed in claim 3 wherein said housing includes an annular flange positioned at least partially below said pair of inlet and outlet ports in said second chamber, said housing received and secured within said bore by said partition assembly, said valve element comprising a cylindrical body having at one end a trucated conical pressure surface forming a valve face and a recess at the other end, a cap adjustably inserted into the recess of said housing opposite said valve, and spring means biasing said valve against said adjustable cap.

7. The apparatus as claimed in claim 6 wherein said valve face sealingly inserted in said interconnecting passage is larger than said passage so that part of said face is exposed in said first chamber and part of said face is exposed in said second chamber, said valve face exposed to said first chamber and projected on a plane perpendicular to the axial displacement of said valve face when said valve is displaced from said sealing position equals in area that portion of said valve face exposed to said second chamber and projected on said perpendicular plane.

8. The apparatus as claimed in claim 3 wherein a part of said rotatable means is threaded into said partition assembly and a part is exposed external to said casing, said exposed external part comprising a handle to enable manual displacement of said valve from said interconnecting passage sealing position when rotated.

9. The apparatus as claimed in claim 1 wherein said cartridge securing means is an annular cap ring threaded onto said casing for sealing and securing said partition assembly to the upper portion of said bore.

10. In a fluid relief and bypass valve the combination comprising a casing having a bore with a lip portion at one end thereof, a cartridge fitted within said bore against said lip portion, said cartridge having at one end a cylindrical valve assembly and at the other end a partition assembly dividing said bore into a first and second chamber, said partition assembly provided with an opening interconnecting said first and second chambers, each of said chambers communicating with inlet and outlet ports through said casing, said valve assembly including a movable valve means to seal and unseal said opening interconnecting said first and second chambers, said valve means normally sealing said opening and including an adjustable cap and pressure spring means bearing against said valve means and the adjustable cap, said adjustable cap operable within said valve assembly for selectively determining relief pressure, manual rotatable means positioned within said partition assembly for manually displacing said valve means from said sealing said interconnecting opening, and a cartridge securing means for securing said cartridge in said bore.

11. The combination as claimed in claim 10 wherein said valve means sealing said interconnecting opening has a relief pressure surface exposed to both said first and second chambers, said exposed relief pressure surfaces in said first and second chambers being so shaped and dimensioned as to be deflected by the same pressure to relief fluid flowing through said inlet and outlet ports in said casing.

12. The combination as claimed in claim 10 wherein said cartridge securing means is an annular cap ring threaded onto said casing for sealing and retaining said cartridge in said bore.

References Cited

UNITED STATES PATENTS

| | | |
|---|---|---|
| 2,989,072 | 6/1961 | Banker. |
| 3,100,503 | 8/1963 | Tennis _____ 137—493 XR |
| 2,589,979 | 6/1952 | Drane _____ 137—493 |
| 1,148,568 | 8/1915 | Bees _____ 137—510 XR |

FOREIGN PATENTS

| | | |
|---|---|---|
| 620,788 | 5/1961 | Canada. |
| 901,061 | 7/1962 | Great Britain. |
| 121,002 | | Australia. |
| 945,328 | | England. |

M. CARY NELSON, Primary Examiner

ROBERT J. MILLER, Assistant Examiner